US012685412B2

(12) United States Patent
Lin et al.

(10) Patent No.: US 12,685,412 B2
(45) Date of Patent: Jul. 21, 2026

(54) TOWEL HEATING DEVICE

(71) Applicant: Guangzhou Hansong Tuojiang Technology Co., Ltd., Guangzhou (CN)

(72) Inventors: Zhenji Lin, Guangzhou (CN); Yueqing Li, Guangzhou (CN)

(73) Assignee: Guangzhou Hansong Tuojiang Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/339,361

(22) Filed: Sep. 25, 2025

(65) Prior Publication Data

US 2026/0020728 A1 Jan. 22, 2026

Related U.S. Application Data

(63) Continuation-in-part of application No. 30/007,620, filed on Jun. 10, 2025, and a continuation-in-part of application No. 19/216,853, filed on May 23, 2025, and a continuation-in-part of application No. 19/216,795, filed on May 23, 2025, now Pat. No. 12,490,871, and a continuation-in-part of application No. 19/189,293, filed on Apr. 25, 2025, which is a continuation-in-part of application No. 18/763,734, filed on Jul. 3, 2024, said application No. 19/216,795

(Continued)

(30) Foreign Application Priority Data

Mar. 7, 2024 (CN) ......................... 202410260988.9
Mar. 7, 2024 (CN) ......................... 202420441375.0
Apr. 8, 2025 (CN) ......................... 202520656668.5
Apr. 25, 2025 (CN) ......................... 202520812659.0
Apr. 25, 2025 (CN) ......................... 202520812692.3
May 28, 2025 (CN) ......................... 202530301692.2
Jun. 23, 2025 (CN) ......................... 202521300693.6

(51) Int. Cl.
*A47K 10/06* (2006.01)
*A47K 10/02* (2006.01)
*H05B 3/34* (2006.01)

(52) U.S. Cl.
CPC ............ *A47K 10/06* (2013.01); *A47K 10/025* (2013.01); *H05B 3/347* (2013.01)

(58) Field of Classification Search
CPC ...... A47K 10/00; A47K 10/02; A47K 10/025; A47K 10/04; H05B 3/347
USPC .......................................................... 219/386
See application file for complete search history.

(56) References Cited

U.S. PATENT DOCUMENTS 5,569,401 A * 10/1996 Gilliland ................ A47K 10/06 219/521
5,667,066 A * 9/1997 Simpson ............. B65B 67/1244 220/9.3

(Continued)

*Primary Examiner* — Sang Y Paik

(57) ABSTRACT

A towel heating device includes a heating device body, a bracket, and a heating assembly. The heating device body defines an accommodation cavity and an opening communicated to the accommodation cavity. The heating device body is flexible. The bracket is flexible, and the heating device body is arranged on the bracket. When the bracket is folded, the heating device body is driven to fold, and when the bracket is unfolded, the heating device body is driven to unfold. The heating assembly is arranged on the heating device body and configured to heat the accommodation cavity.

15 Claims, 9 Drawing Sheets

Related U.S. Application Data is a continuation-in-part of application No. 18/763,632, filed on Jul. 3, 2024, now Pat. No. 12,329,326.

(56) References Cited

U.S. PATENT DOCUMENTS

| | | | | |
|---|---|---|---|---|
| 6,018,143 | A * | 1/2000 | Check | A47J 47/145 219/549 |
| 7,334,684 | B1 * | 2/2008 | Fontanilla | A45C 13/02 190/110 |
| 2019/0225375 | A1 * | 7/2019 | Sena | A47G 29/20 |

* cited by examiner

TOWEL HEATING DEVICE

CROSS REFERENCE TO RELATED APPLICATIONS

This application is a continuation-in-part of the U.S. patent application Ser. No. 30/007,620, filed on Jun. 10, 2025, a continuation-in-part of the U.S. patent application Ser. No. 19/189,293, filed on Apr. 25, 2025, a continuation-in-part of the U.S. patent application Ser. No. 19/216,795, filed on May 23, 2025, and a continuation-in-part of the U.S. patent application Ser. No. 19/216,853, filed on May 23, 2025. This application claims foreign priorities of the Chinese patent application No. 202410260988.9, filed on Mar. 7, 2024, the Chinese patent application No. 202420441375.0, filed on Mar. 7, 2024, the Chinese patent application No. 202520656668.5, filed on Apr. 8, 2025, the Chinese patent application No. 202520812659.0, filed on Apr. 25, 2025, the Chinese patent application No. 202520812692.3, filed on Apr. 25, 2025, the Chinese patent application No. 202521300693.6, filed on Jun. 23, 2025, and the Chinese patent application No. 202530301692.2, filed on May 28, 2025. The disclosure of which is hereby incorporated by reference in their entireties.

The U.S. patent application Ser. No. 30/007,620 claims foreign priorities of the Chinese patent application No. 202530301692.2, filed on May 28, 2025.

The U.S. application Ser. No. 19/189,293 is a continuation-in-part of the U.S. application Ser. No. 18/763,632, filed on Jul. 3, 2024 and a continuation-in-part of the U.S. application Ser. No. 18/763,734, filed on Jul. 3, 2024 and claims foreign priorities of the Chinese patent application No. 202410260988.9, filed on Mar. 7, 2024, the Chinese patent application No. 202420441375.0, filed on Mar. 7, 2024, and the Chinese patent application No. 202520656668.5, filed on Apr. 8, 2025.

The U.S. patent application Ser. No. 19/216,795 is a continuation-in-part of the U.S. application Ser. No. 18/763,632, filed on Jul. 3, 2024 and a continuation-in-part of the U.S. application Ser. No. 18/763,734, filed on Jul. 3, 2024 and claims foreign priorities of the Chinese patent application No. 202410260988.9, filed on Mar. 7, 2024, the Chinese patent application No. 202420441375.0, filed on Mar. 7, 2024, and the Chinese patent application No. 202520812659.0, filed on Apr. 25, 2025.

The U.S. patent application Ser. No. 19/216,853 is a continuation-in-part of the U.S. application Ser. No. 18/763,632, filed on Jul. 3, 2024 and a continuation-in-part of the U.S. application Ser. No. 18/763,734, filed on Jul. 3, 2024 and claims foreign priorities of the Chinese patent application No. 202410260988.9, filed on Mar. 7, 2024, the Chinese patent application No. 202420441375.0, filed on Mar. 7, 2024, and the Chinese patent application No. 202520812692.3, filed on Apr. 25, 2025.

FIELD OF THE DISCLOSURE

The present disclosure relates to the field of household products, and in particular, to a towel heating device.

BACKGROUND

Towel heating buckets are primarily used for placing towels and heating the towels. The towel heating buckets can quickly heat towels to a suitable temperature, allowing people to experience a more comfortable towel temperature after bathing or washing their face. Currently, a bucket body of the towel heating buckets generally has a fixed structure, which occupies a large amount of space, cannot be deformed, and is inconvenient to carry and store.

Therefore, it is necessary to improve existing towel heating buckets to avoid the aforementioned drawbacks.

SUMMARY

The following presents a simplified summary of the disclosure in order to provide a basic understanding of some aspects of the disclosure. This summary is not an extensive overview of the disclosure. It is not intended to identify critical elements or to delineate the scope of the disclosure. Its sole purpose is to present some concepts of the disclosure in a simplified form as a prelude to the more detailed description that is presented elsewhere.

In some embodiments, a towel heating device is provided. The towel heating device includes a heating device body, a bracket, and a heating assembly. The heating device body defines an accommodation cavity and an opening communicated to the accommodation cavity. The heating device body is flexible. The bracket is flexible, and the heating device body is arranged on the bracket. When the bracket is folded, the heating device body is driven to fold, and when the bracket is unfolded, the heating device body is driven to unfold. The heating assembly is arranged on the heating device body and configured to heat the accommodation cavity.

BRIEF DESCRIPTION OF THE DRAWINGS

Illustrative embodiments of the present disclosure are described in detail below with reference to the attached drawing figures.

NUMERAL REFERENCE IN THE DRAWINGS

Figure 1:
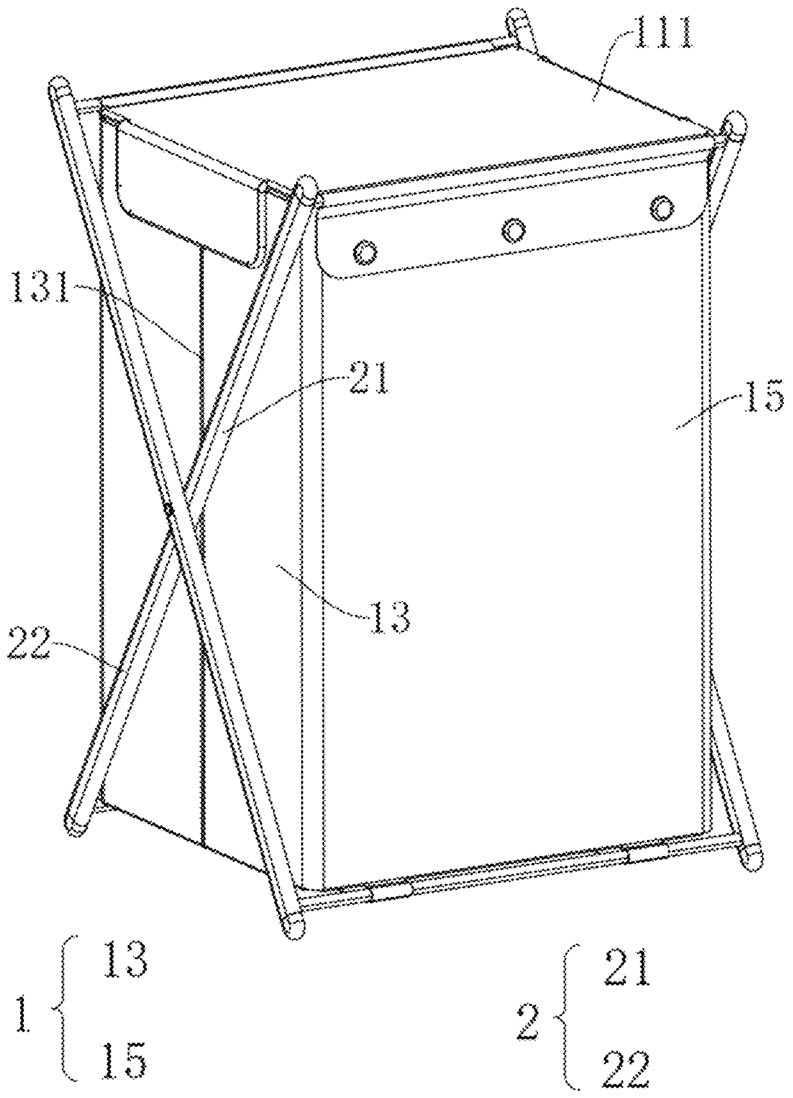
FIG. 1 is a structural view of a towel heating device according to an embodiment of the present disclosure.

1—heating device body; 11—accommodation cavity; 12—opening; 13—first folding wall; 131—folding groove; 14—second folding wall; 15—first side wall; 151—first body portion; 152—connecting portion; 153—binding strap; 16—second side wall; 17—bottom wall; 171—first flexible layer; 172—rigid layer; 173—second flexible layer; 18—first fabric layer; 19—thermal insulation layer; 110—second fabric layer; 111—cover; 1111—second body portion; 1112—extension portion;

2—bracket; 21—first side frame; 211—first support rod; 212—second support rod; 213—first connecting rod; 214—second connecting rod; 22—second side frame; 221—third support rod; 222—fourth support rod; 223—third connecting rod; 224—fourth connecting rod;

3—heating assembly; 31—heating wire;

4—wiring member;

5—power controller;

6—shielding layer.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure shall fall within the scope of the disclosure.

It should be noted that the terms "first", "second", etc. in the description, claims, and accompanying drawings of the present disclosure are used to distinguish similar objects, and are not necessarily used to describe a specific order or sequence. It should be understood that the data used in this way can be interchanged in appropriate circumstances, so that the embodiments of the present disclosure described herein can be implemented in an order other than those illustrated or described herein.

In the description of the present disclosure, it needs to be explained that unless otherwise clearly specified and limited, the terms "arranged", "mounted", "connected", "coupled" should be understood in a broad sense. For example, it can be a fixed connection, or a detachable connection, or an integrated connection; it can be a mechanical connection; it can be directly connected, or indirectly connected through an intermediate medium, or it can be an internal communication between two components. For those skilled in the art, the specific meaning of the above terms in the present disclosure can be understood in specific situations.

In the description of this specification, reference to terms such as "example", "an example", and "an embodiment" means that specific features, structures, materials, or characteristics described in conjunction with the example or embodiment are included in at least one example or embodiment of the present disclosure. The illustrative descriptions of the above terms in this specification do not necessarily refer to the same example or embodiment. Moreover, the described specific features, structures, materials, or characteristics can be combined in any one or more examples or embodiments in a suitable manner.

The present disclosure will be described in detail below with reference to the accompanying drawings.

To solve the above technical problems, as shown in FIGS. 1, 2, 3, and 6, an embodiment of the present disclosure provides a towel heating device. The towel heating device may include a heating device body 1, a bracket 2, and a heating assembly 3. The heating device body 1 may be flexible and define an accommodation cavity 11 and an opening 12. The opening 12 may be communicated with the accommodation cavity 11, facilitating users to place or retrieve items such as towels in the accommodation cavity 11 through the opening 12. The bracket 2 may be foldable, and the heating device body 1 may be arranged on the bracket 2, relying on the bracket 2 for support and unfolding. Therefore, when the bracket 2 is folded, the heating device body 1 may be driven to fold, the accommodation cavity 11 may also be compressed, and the opening 12 of the accommodation cavity 11 may be closed. When the bracket 2 is unfolded, the heating device body 1 may be driven to unfold, the accommodation cavity 11 may also expand, and the opening 12 of the accommodation cavity 11 may open. The heating assembly 3 may be arranged on the heating device body 1 and may heat the accommodation cavity 11. In summary, the towel heating device of the present disclosure may be folded, facilitating user portability and storage.

Figure 2:
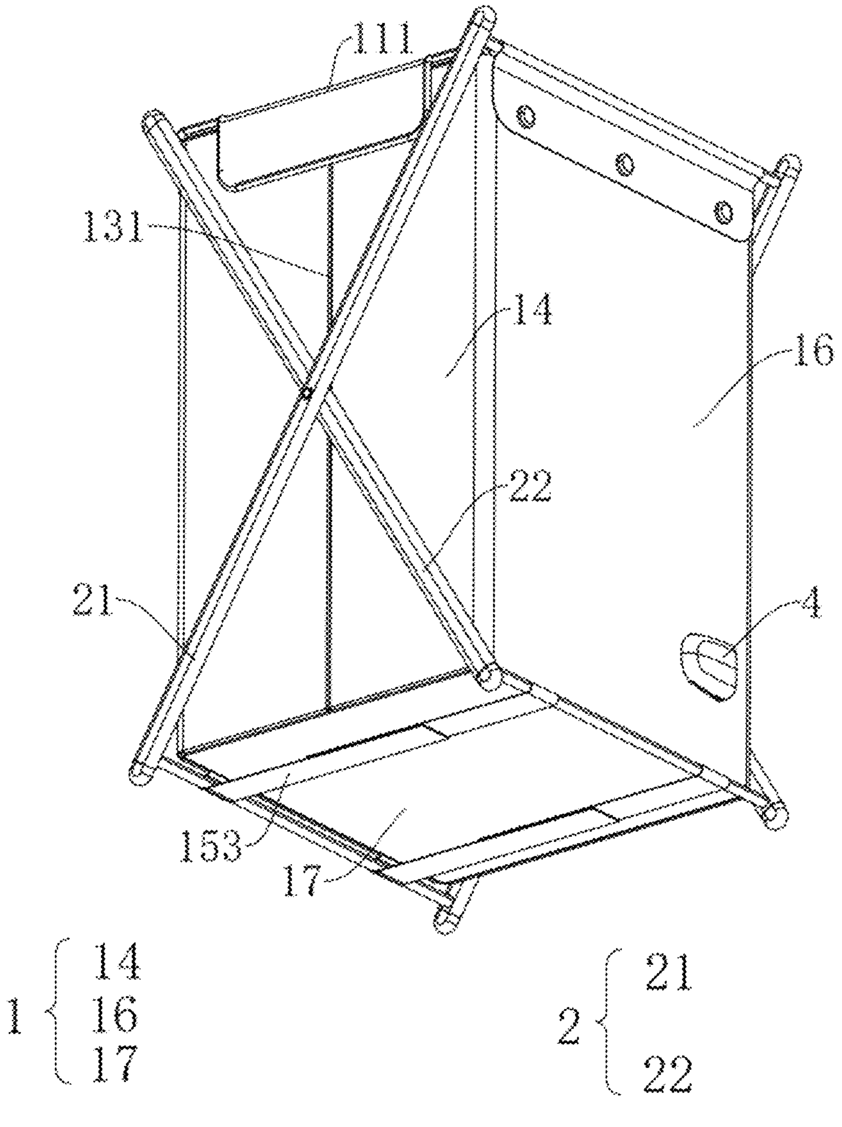
FIG. 2 is a structural view of the towel heating device from another perspective according to an embodiment of the present disclosure.

In one embodiment of the present disclosure, as shown in FIGS. 1 and 2, the heating device body 1 may include a first folding wall 13 and a second folding wall 14 which may be arranged opposite each other. Each of the first folding wall 13 and the second folding wall 14 may be made of a flexible material and may form part of a circumferential side wall of the heating device body 1. Each of the first folding wall 13 and the second folding wall 14 may define a folding groove 131. The folding groove 131 may extend vertically along a wall face of a respective one of the first folding wall 13 and the second folding wall 14. The folding groove 131 of the first folding wall 13 and the folding groove 131 of the second folding wall 14 may be symmetrically to each other. Particularly, the folding groove 131 may be formed at a central position of the respective one of the first folding wall 13 and the second folding wall 14. When the heating device body 1 is folded, each of the first folding wall 13 and the second folding wall 14 may fold inward to the accommodation cavity 11 synchronously along the folding groove 131 of the respective one of the first folding wall 13 and the second folding wall 14. During a folding operation, the folding groove 131 of each of the first folding wall 13 and the second folding wall 14 may serve as a mechanical guiding structure, enabling the respective one of the first folding wall 13 and the second folding wall 14 to undergo controlled folding deformation along a preset path, thereby avoiding structural damage caused by disordered wrinkling. A portion of the heating device body 1 close to the folding groove 131 may be softer compared to other portions of the heating device body 1, allowing the heating device body 1 to be three-dimensional and crisp when unfolded, and to deform along the folding groove 131 when folded, also facilitating user folding and storage.

In one embodiment of the present disclosure, as shown in FIGS. 1 and 2, the heating device body 1 may further include a first side wall 15 and a second side wall 16 which may be arranged opposite each other. Each of the first side wall 15 and the second side wall 16 may be made of a flexible material. The first side wall 15 may be connected between one end of the first folding wall 13 and one end of the second folding wall 14, and the second side wall 16 may be connected between the other end of the first folding wall 13 and the other end of the second folding wall 14. The first side wall 15, the second side wall 16, the first folding wall 13, and the second folding wall 14 may cooperatively define the circumferential side wall of the heating device body 1.

The bracket 2 may include a first side frame 21 and a second side frame 22. The first side wall 15 may be connected to and arranged on the first side frame 21 and the second side frame 22, and the second side wall 16 may also be connected to and arranged on the first side frame 21 and the second side frame 22. The first side frame 21 and the second side frame 22 may be folded or unfolded relative to each other to drive the first side wall 15 and the second side wall 16 to move close to or away from each other.

Specifically, when performing the folding operation, the user may make the first side frame 21 and the second side frame 22 rotate relative to each other and move close to each other, thereby driving the first side wall 15 and the second side wall 16 to move inward to the receiving cavity 11. At this time, each of the first folding wall 13 and the second folding wall 14, due to a reduced spacing between the first side wall 15 and the second side wall 16, may fold inward to the accommodation cavity 11 along the folding groove 131 of the respective one of the first folding wall 13 and the second folding wall 14, ultimately achieving an overall folding of the heating device body 1. Conversely, when the first side frame 21 and the second side frame 22 rotate and unfold relative to each other, the first side wall 15 and the second side wall 16 may be propped open to have a preset spacing relative to each other, and simultaneously, the first folding wall 13 and the second folding wall 14 may be pulled by the first side frame 21 and the second side frame 22 to return to a vertical state, cooperatively defining the accommodation cavity 11. It can be understood that the heating device body 1 may further include a bottom wall 17, which may also made of the flexible material and may fold or unfold cooperated with the circumferential wall of the heating device body 1.

Figure 5:
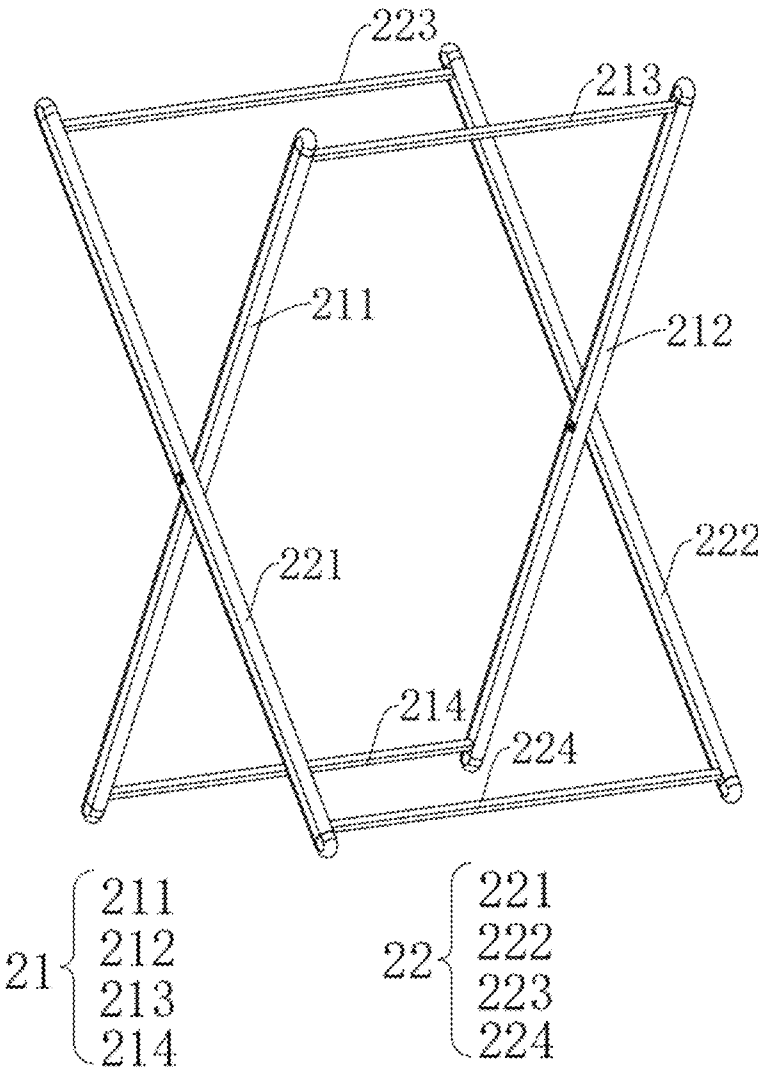
FIG. 5 is a structural view of a bracket according to an embodiment of the present disclosure.

As shown in FIGS. 1, 2, and 5, the first side frame 21 and the second side frame 22 may be arranged in a crossed manner and hinged to each other. Specifically, the first side frame 21 may include a first support rod 211, a second support rod 212, a first connecting rod 213, and a second connecting rod 214. Each of the first connecting rod 213 and the second connecting rod 214 may be connected to and arranged between the first support rod 211 and the second support rod 212. The first support rod 211 and the second support rod 212 may be arranged spaced apart from each other, and the first connecting rod 213 and the second connecting rod 214 may be arranged in parallel with each other. The first connecting rod 213 may be connected between one end of the first support rod 211 and one end of the second support rod 212, and the second connecting rod 214 may be connected between the other end of the first support rod 211 and the other end of the second support rod 212. The second side frame 22 may include a third support rod 221, a fourth support rod 222, a third connecting rod 223, and a fourth connecting rod 224. Each of the third connecting rod 223 and the fourth connecting rod 224 may be connected to and arranged between the third support rod 221 and the fourth support rod 222. Similarly, the third support rod 221 and the fourth support rod 222 may be arranged spaced apart from each other. The third connecting rod 223 and the fourth connecting rod 224 may be arranged in parallel with each other. The third connecting rod 223 may be connected between one end of the third support rod 221 and one end of the fourth support rod 222, and the fourth connecting rod 224 may be connected between the other end of the third support rod 221 and the other end of the fourth support rod 222.

The first support rod 211 and the third support rod 221 may be arranged in a crossed manner and hinged to each other at a middle point of each of the first support rod 211 and the third support rod 221. Specifically, the first support rod 211 and the third support rod 221 may be cross-connected with each other by a hinge shaft. The second support rod 212 and the fourth support rod 222 may be arranged in a crossed manner and hinged to each other at a middle point of each of the second support rod 212 and the fourth support rod 222. Similarly, the second support rod 212 and the fourth support rod 222 may also be cross-connected with each other by a hinge shaft, so that the first side frame 21 and the second side frame 22 may be rotated relative to each other and folded or unfolded relative to each other about two crossing points. Each of two ends of the first side wall 15 may be connected to and arranged on a respective one of the first connecting rod 213 and the fourth connecting rod 224, and each of two ends of the second side wall 16 may be connected to and arranged on a respective one of the third connecting rod 223 and the second connecting rod 214.

During the folding operation, the first side frame 21 and the second side frame 22 may rotate and fold relative to each other about middle points, accordingly causing the first connecting rod 213 and the third connecting rod 223 to move close to each other, and causing the second connecting rod 214 and the fourth connecting rod 224 to move close to each other. The first side wall 15 connected to the first connecting rod 213 and the fourth connecting rod 224 and the second side wall 16 connected to the third connecting rod 223 and the second connecting rod 214 may be pulled and synchronously move close to each other, cooperating with folding of the first folding wall 13 and the second folding wall 14. Conversely, during an unfolding operation, each of two ends of the first support rod 211 and a respective one of two ends of the third support rod 221 may spread apart from each other, and each of two ends of the second support rod 212 and a respective one of two ends of the fourth support rod 222 may spread apart from each other, accordingly causing the first connecting rod 213 and the third connecting rod 223 to move away from each other, and causing the second connecting rod 214 and the fourth connecting rod 224 to move away from each other. At this time, the first side wall 15 and the second side wall 16 may be pulled away from each other to form a preset spacing between the first side wall 15 and the second side wall 16, cooperating with unfolding of the first folding wall 13 and the second folding wall 14.

Figure 3:
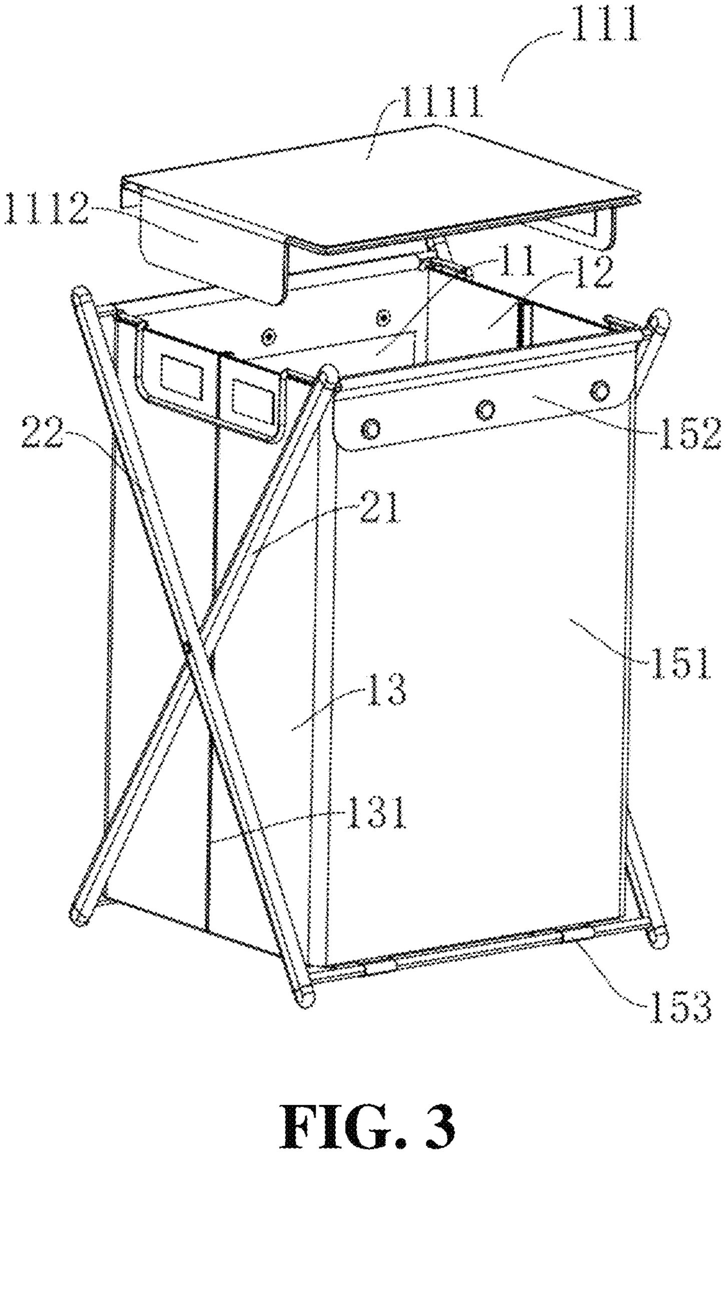
FIG. 3 is a partially exploded view of the towel heating device according to an embodiment of the present disclosure.
Figure 4:
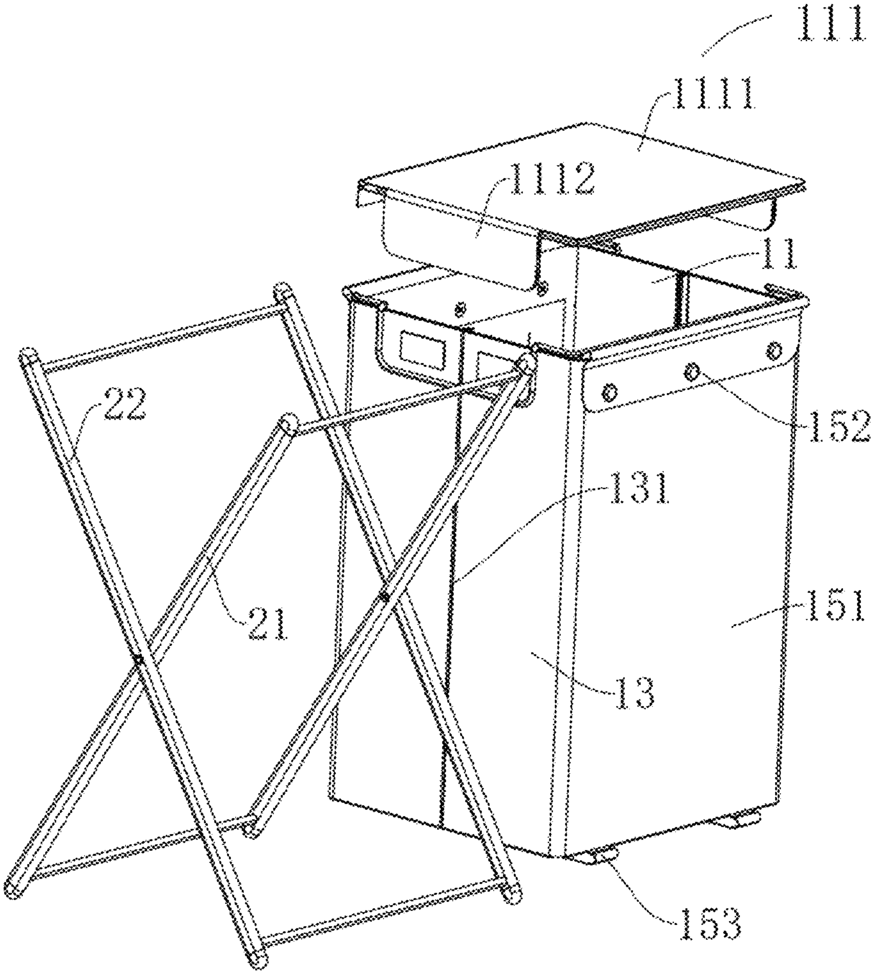
FIG. 4 is an exploded view of the towel heating device according to an embodiment of the present disclosure.

In one embodiment of the present disclosure, as shown in FIGS. 3-5, each of the first side wall 15 and the second side wall 16 may include a first body portion 151 and a connecting portion 152 extending from the first body portion 151. The first body portion 151 of each of the first side wall 15 and the second side wall 16 may be a main area of a respective one of the first side wall 15 and the second side wall 16 for defining the accommodation cavity 11. The connecting portion 152 of each of the first side wall 15 and the second side wall 16 may be detachably connected to a respective one of the first connecting rod 213 and the third connecting rod 223. Specifically, the connecting portion 152 of the each of the first side wall 15 and the second side wall 16 may be detachably connected to a respective one of the first connecting rod 213 and the third connecting rod 223 via a quick-release buckle or a bolt, to achieve rapid assembly and separation of the heating device body 1 and the bracket 2, allowing the towel heating device to be further disassembled for storage. Particularly, the connecting portion 152 of the first side wall 15 may pass over a top portion of the first connecting rod 213 and fold back to attach to a portion of the first side wall 15, and the connecting portion 152 of the second side wall 16 may pass over a top portion of the third connecting rod 223 and then fold back to attach to a portion of the second side wall 16. Moreover, the first connecting portion 152 of the first side wall 15 and the portion of the first side wall 15 may be detachably connected with each other by means such as a hook and loop fastener, a snap button, or magnetic attraction, and the second connecting portion 152 of the second side wall 16 and the portion of the second side wall 16 may be detachably connected by means such as the hook and loop fastener, the snap button, or the magnetic attraction.

As shown in FIGS. 2-4, the towel heating body 1 device may further include at least one binding strap 153. The binding strap 153 may be a nylon webbing or an elastic silicone binding strap. The at least one binding strap 153 may be detachably connected to and arranged between a bottom end of the first body portion 151 of the first side wall 15 and a bottom end of the first body portion 151 of the second side wall 16, arranged passing around the second connecting rod 214 and the fourth connecting rod 224, and fixed below the heating device body 1, forming a closed loop structure. When the heating device body 1 is unfolded, the binding strap 153 may press the bottom end of the first body portion 151 of the first side wall 15 against the fourth connecting rod 224 and press the bottom end of the first body portion 151 of the second side wall 16 against the second connecting rod 214, through tension. When the heating device body 1 is folded, the binding strap 153 may drive the bottom end of the first body portion 151 of the first side wall 15 and the bottom end of the first body portion 151 of the second side wall 16 to move close to each other along with the second connecting rod 214 and the fourth connecting rod 224. Particularly, the number of the at least one binding strap 153 may be two. Each of the two binding straps 153 may be connected to and arranged on the first side wall 15 and the second side wall 16. The two binding straps 153 may be detachably connected to the first side wall 15 and the second side wall 16 by the hook and loop fastener, the snap button, etc., to facilitate rapid assembly and separation of the heating device body 1 and the bracket 2.

Figure 6:
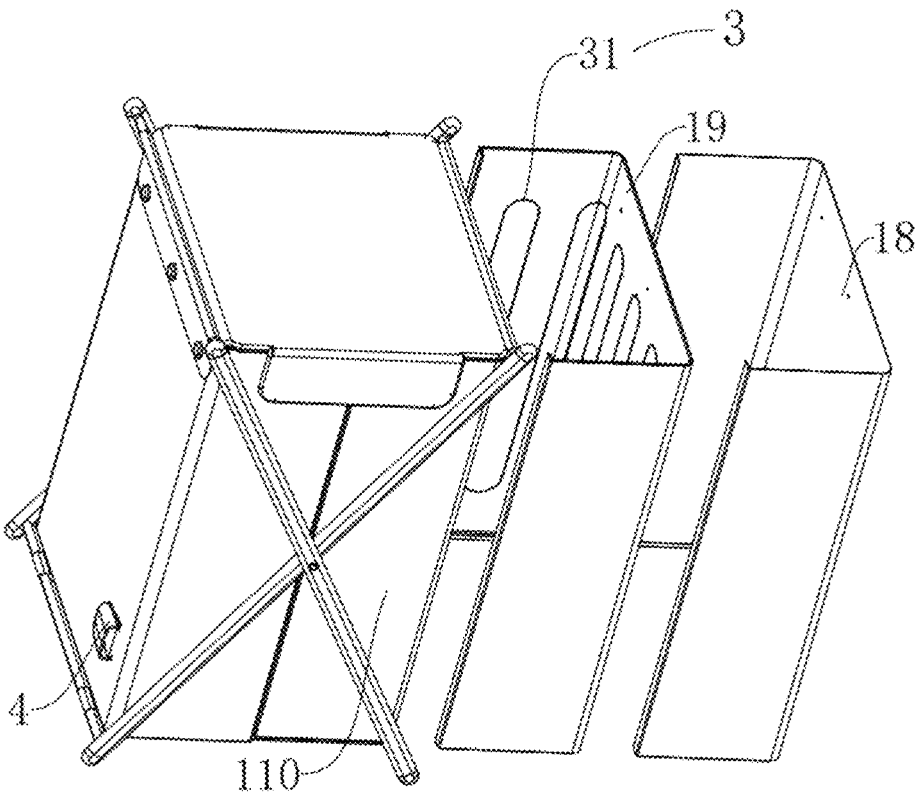
FIG. 6 is a partially exploded view of the heating device body according to an embodiment of the present disclosure.

In one embodiment of the present disclosure, as shown in FIG. 6, the heating device body 1 may include a first folding wall 13, a second folding wall 14, a first side wall 15, and a second side wall 16. Each of the first folding wall 13, the second folding wall 14, the first side wall 15, and the second side wall 16 may include a first fabric layer 18, a thermal insulation layer 19, and a second fabric layer 110. The thermal insulation layer 19 may be arranged between the first fabric layer 18 and the second fabric layer 110. The heating assembly 3 may be arranged in the thermal insulation layer 19. The first fabric layer 18 may serves as an outer protective layer and may be made of waterproof, wear-resistant aramid blended fabric or nylon cloth coated with a silicone coating, possessing characteristics such as high temperature resistance and anti-wrinkle. The thermal insulation layer 19 may be arranged between the first fabric layer 18 and the second fabric layer 110 and may be made of heating cotton or high-density ceramic fiber felt, which may significantly reduce heat loss to an external environment. The second fabric layer 110 may serve as an inner layer that may directly contact the towels and may be made of food-grade silicone-coated polyester cloth or antibacterial-treated pure cotton fabric, possessing characteristics such as softness, skin-friendliness, and high temperature resistance. In particular, the heating assembly 3 may be evenly arranged in the thermal insulation layer 19, fixed by thermally conductive adhesive and electrically connected to a temperature control system, which may not only ensure uniform distribution of heat in the heating device body 1 but also utilize thermal insulation characteristics of the thermal insulation layer 19 to maximize heat retention in the accommodation cavity 11.

As shown in FIG. 6, the heating assembly 3 may be a heating wire 31. The thermal insulation layer 19 may be the heating cotton. The heating wire 31 may be woven in the thermal insulation layer 19. Specifically, the heating wire 31 may be arranged meandering in an S-shape along a thickness direction of the thermal insulation layer 19 while being arranged in parallel at certain intervals in a horizontal plane, forming a crisscross three-dimensional heating matrix.

In one embodiment of the present disclosure, as shown in FIGS. 3 and 4, the towel heating device may further include a cover 111. The cover 111 may include a second body portion 1111 and at least one extension portion 1112. The at least one extension portion 1112 may be arranged on at least one side of the second body portion 1111. An area of the second body portion 1111 may be consistent with an area of the opening 12 of the accommodation cavity 11 and may cover the opening 12. At least one side, particularly two sides, of the second body portion 1111 may extend to form the at least one extension portion 1112. The at least one extension portion 1112 may be bent downward relative to the second body portion 1111 and detachably connected to the heating device body 1. The extension portion 1112 and the heating device body 1 may be detachably connected with each other by various means such as the magnetic attraction, the hook and loop fastener, or the snap button, ensuring stability of the cover 111 when closed and facilitating users to quickly remove, clean, or replace the cover 111.

Figure 7:
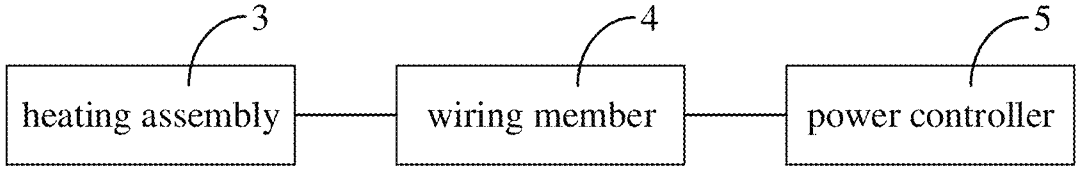
FIG. 7 is a schematic block diagram of a heating assembly, a wiring member, and a power controller according to an embodiment of the present disclosure.

In one embodiment of the present disclosure, as shown in FIGS. 2, 6, and 7, the towel heating device may further include a wiring member 4. The wiring member 4 may be arranged on the heating device body 1. The wiring member 4 may include an input end and an output end. The output end may be electrically connected to the heating assembly 3, and the input end may be adapted to an external power controller 5 and used to be electrically connected to the external power controller 5 to supply power to the heating assembly 3 and control an operation of the heating assembly 3 through the external power controller 5.

As shown in FIG. 2, the bottom wall 17 may be at least partially made of the flexible material, specifically flexible fabric. The bottom wall 17 may be connected to a bottom portion of each of the first folding wall 13, the second folding wall 14, the first side wall 15, and the second side wall 16. The bottom wall 17, the first folding wall 13, the second folding wall 14, the first side wall 15, and the second side wall 16 may cooperatively define the accommodation cavity 11. When the heating device body 1 is folded, the bottom wall 17 may be folded accordingly for storage.

Figure 8:
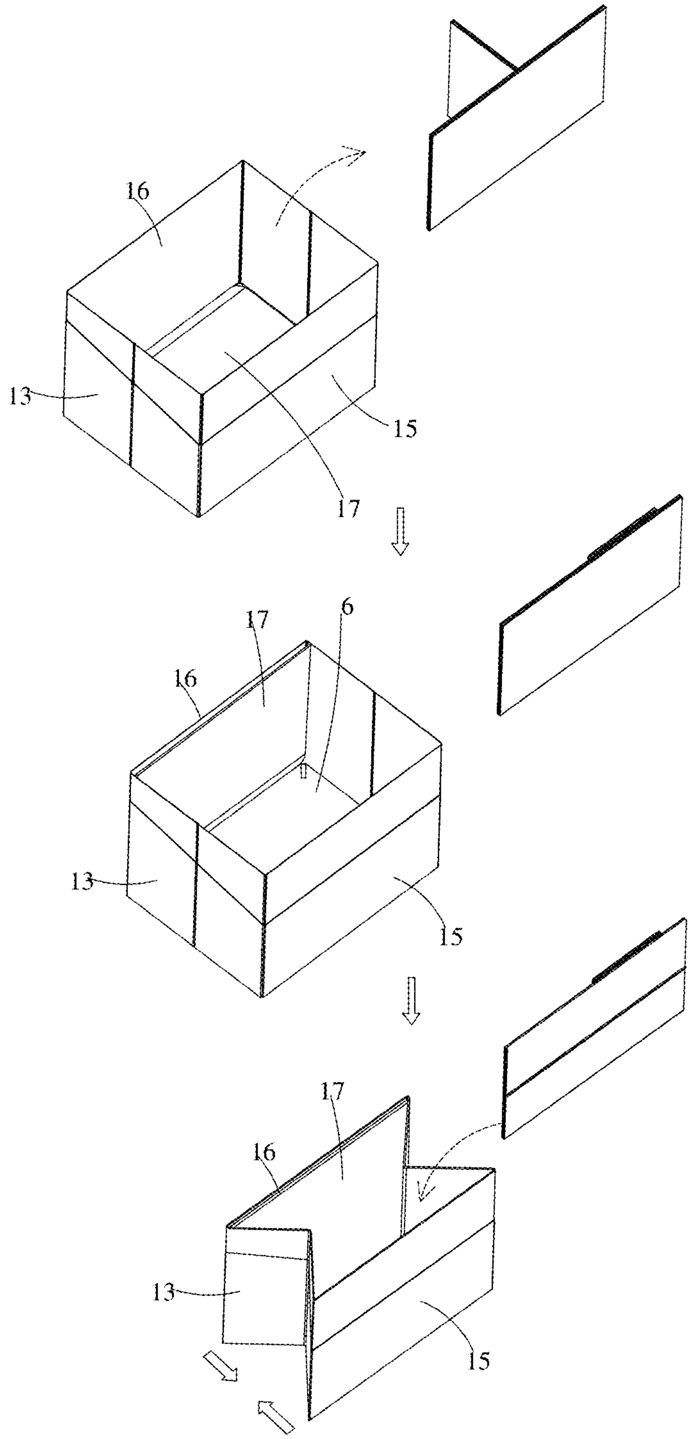
FIG. 8 is a schematic view of a storage process of the towel heating device according to an embodiment of the present disclosure.
Figure 9:
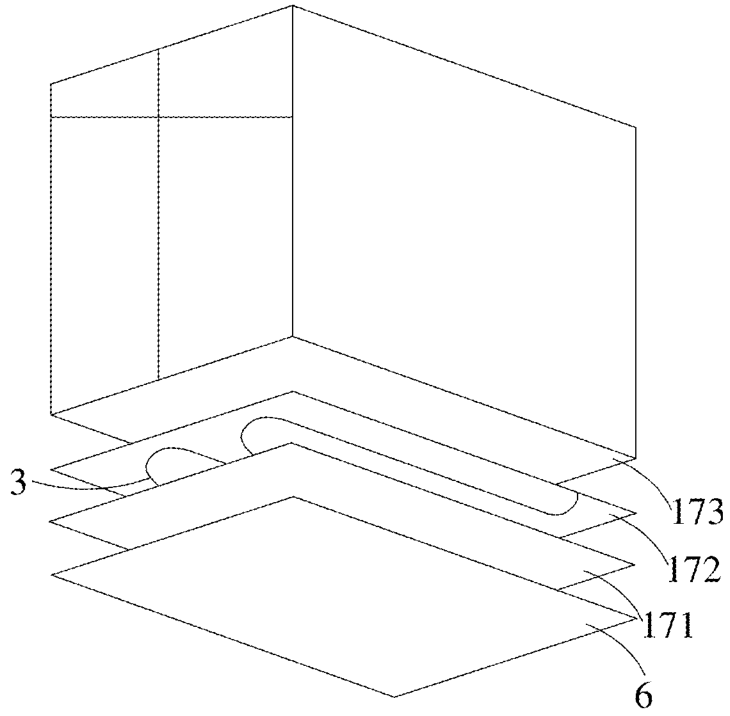
FIG. 9 is a partially exploded view of the towel heating device according to an embodiment of the present disclosure.

Furthermore, as shown in FIGS. 8-9, the bottom wall 17 may be movably connected to one of the first side wall 15 and the second side wall 16. Each of the first folding wall 13, the second folding wall 14, and the other of the first side wall 15 and the second side wall 16 may be detachably connected to the bottom wall 17, specifically achieved through means such as a hook-and-loop fastener or a snap fastener. Specifically, the bottom wall 17 may include a first flexible layer 171, a rigid layer 172, and a second flexible layer 173 which may be arranged from an exterior of the towel heating device to an interior of the towel heating device. A side of each of the first flexible layer 171 and the second flexible layer 173 may be movably connected to one of the first side wall 15 and the second side wall 16, and other sides of each of the first flexible layer 171 and the second flexible layer 173 may be detachably connected to each of the first folding wall 13, the second folding wall 14, and the other of the first side wall 15 and the second side wall 16. Each of the first flexible layer 152 and the second flexible layer 154 may be made of a fabric material, and the rigid layer 153 may be a honeycomb board. When the towel heating device needs to be stored, detachable connections between the bottom wall 17 and each of the first folding wall 13, the second folding wall 14, and the other of the first side wall 15 and the second side wall 16 may be released first. The bottom wall 17 may then rotated to be folded relative to the one of the first side wall 15 and the second side wall 16 which is movably connected with the bottom wall 17 toward a top portion of the towel heating device until the bottom wall 17 lies flat against the one of the first side wall 15 and the second side wall 16 which is movably connected with the bottom wall 17. After the towel heating bucket is folded, the bottom wall 17 may be located between the first side wall 15 and the second side wall 16, or on a side of the one of the first side wall 15 and the second side wall 16 which is movably connected with the bottom wall 17 facing away from the other of the first side wall 15 and the second side wall 16.

In one embodiment, the bottom wall 17 may heat the accommodation cavity 11. Specifically, a portion of the heating assembly 3 may be arranged on the bottom wall 17, particularly on the rigid layer 172 and between the first flexible layer 171 and the second flexible layer 173, thereby providing the bottom wall 17 with a heating function. In other embodiments, the bottom wall 17 may also be arranged with a heating mechanism independent of the heating assembly 3.

In one embodiment, as shown in FIG. 8-9, the towel heating device may further include a shielding layer 6. The shielding layer 6 may be arranged at a bottom end of the heating device body 1, specifically on a side of the bottom wall 17 away from the accommodation cavity 11, thereby providing a shielding protection for the bottom wall 17. The shielding layer 6 may be connected to bottom edges of the first folding wall 13, the second folding wall 14, the first side wall 15, and the second side wall 16. Furthermore, the shielding layer 6 may be made of a flexible material, such as flexible fabric, so as not to affect folding of the heating device body 1.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A towel heating device, comprising:

a heating device body, defining an accommodation cavity and an opening communicated to the accommodation cavity, wherein the heating device body is foldable;

a bracket, wherein the bracket is foldable, and the heating device body is arranged on the bracket; when the bracket is folded, the heating device body is driven to fold, and when the bracket is unfolded, the heating device body is driven to unfold; and a heating assembly, arranged on the heating device body and configured to heat the accommodation cavity;

wherein, the heating device body comprises a folding wall, two side walls, and a bottom wall; the folding wall, the two side walls, and the bottom wall cooperatively define the accommodation cavity;

the bottom wall comprises a first fabric layer, a rigid layer, and a second fabric layer which are sequentially arranged from an exterior of the towel heating device to an interior of the towel heating device; a side of each of the first fabric layer and the second fabric layer is movably connected to one of the two side walls, and other sides of each of the first fabric layer and the second fabric layer are detachably connected to each of the folding wall and the other one of the two side walls.

2. The towel heating device according to claim 1, wherein the folding wall comprises a first folding wall and a second folding wall which are arranged opposite each other, each of the first folding wall and the second folding wall defines a folding groove, and during a folding operation of the heating device body, each of the first folding wall and the second folding wall folds towards the accommodation cavity along the folding groove of a respective one of the first folding wall and the second folding wall.

3. The towel heating device according to claim 2, wherein the two side walls comprises a first side wall and a second side wall which are arranged opposite each other, the bottom wall is partially made of fabric, each of the first folding wall, the second folding wall, the first side wall, and the second side wall is connected to the bottom wall, and the bottom wall, the first folding wall, the second folding wall, the first side wall, and the second side wall cooperatively define the accommodation cavity.

4. The towel heating device according to claim 3, wherein the bottom wall is movably connected to one of the first side wall and the second side wall and is foldable relative to the one of the first side wall and the second side wall, and each of the other of the first side wall and the second side wall and the first folding wall and the second folding wall is detachably connected to the bottom wall.

5. The towel heating device according to claim 3, wherein the heating assembly is partially arranged on the bottom wall.

6. The towel heating device according to claim 3, further comprising a shielding layer, the shielding layer is a fabric layer and is arranged on a side of the bottom wall away from the accommodation cavity.

7. The towel heating device according to claim 1, wherein the heating device body further comprises a first side wall and a second side wall which are arranged opposite each other;

the bracket comprises a first side frame and a second side frame, the first side wall is connected to and arranged on the first side frame and the second side frame, the second side wall is connected to and arranged on the first side frame and the second side frame, and the first side frame and the second side frame are configured to fold or unfold relative to each other to drive the first side wall and the second side wall to move close to or away from each other.

8. The towel heating device according to claim 7, wherein the first side frame comprises a first support rod, a second support rod, a first connecting rod, and a second connecting rod, and each of the first connecting rod and the second connecting rod is connected to and arranged between the first support rod and the second support rod;

the second side frame comprises a third support rod, a fourth support rod, a third connecting rod, and a fourth connecting rod, and each of the third connecting rod and the fourth connecting rod is connected to and arranged between the third support rod and the fourth support rod;

the first support rod and the third support rod are arranged in a crossed manner and hinged to each other at a middle point of each of the first support rod and the third support rod, and the second support rod and the fourth support rod are arranged in a crossed manner and hinged to each other at a middle point of each of the second support rod and the fourth support rod;

the first side wall is connected to and arranged on the first connecting rod and the fourth connecting rod, and the second side wall is connected to and arranged on the second connecting rod and the third connecting rod.

9. The towel heating device according to claim 8, wherein each of the first side wall and the second side wall comprise a first body portion and a connecting portion arranged on the first body portion and extending from the first body portion, the connecting portion of the first side wall is detachably connected to the first connecting rod, and the connecting portion of the second side wall is detachably connected to the third connecting rod.

10. The towel heating device according to claim 9, wherein the heating device body further comprises at least one binding strap, the at least one binding strap is detachably connected between the first body portion of the first side wall and the first body portion of the second side wall and is arranged passing around the second connecting rod and the fourth connecting rod.

11. The towel heating device according to claim 1, wherein the heating device body comprises a first fabric layer, a thermal insulation layer, and a second fabric layer, the thermal insulation layer is arranged between the first fabric layer and the second fabric layer, and the heating assembly is arranged in the thermal insulation layer.

12. The towel heating device according to claim 11, wherein the heating assembly is configured as a heating wire, and the heating wire is woven to the thermal insulation layer.

13. The towel heating device according to claim 1, wherein the towel heating device further comprises a cover, the cover comprises a second body portion and at least one extension portion arranged on at least one side of the second body portion, the second body portion covers the opening, and the at least one extension portion is detachably connected to the heating device body.

14. The towel heating device according to claim 1, further comprises a wiring member, the wiring member is arranged on the heating device body, the wiring member comprises an input end and an output end, the output end is electrically connected to the heating assembly, and the input end is configured to be electrically connected to an external power controller.

15. A towel heating device, comprising:

a heating device body, defining an accommodation cavity and an opening communicated to the accommodation cavity, wherein the heating device body is foldable;

a bracket, wherein the bracket is foldable, and the heating device body is arranged on the bracket; when the bracket is folded, the heating device body is driven to fold, and when the bracket is unfolded, the heating device body is driven to unfold; and a heating assembly, arranged on the heating device body and configured to heat the accommodation cavity:

the heating device body comprises a first folding wall and a second folding wall which are arranged opposite each other, each of the first folding wall and the second folding wall defines a folding groove; and during a folding operation of the heating device body, each of the first folding wall and the second folding wall folds towards the accommodation cavity along the folding groove of a respective one of the first folding wall and the second folding wall;

the heating device body further comprises a first side wall, a second side wall opposite to the first side wall, a bottom wall; the bottom wall is partially made of fabric; each of the first folding wall, the second folding wall, the first side wall, and the second side wall is connected to the bottom wall; and the bottom wall, the first folding wall, the second folding wall, the first side wall, and the second side wall cooperatively define the accommodation cavity;

wherein the bottom wall comprises a first fabric layer, a rigid layer, and a second fabric layer which are arranged from an exterior of the towel heating device to an interior of the towel heating device;

a side of each of the first fabric layer and the second fabric layer is movably connected to one of the first side wall and the second side wall, and other sides of each of the first fabric layer and the second fabric layer are detachably connected to each of the first folding wall, the second folding wall, and the other of the first side wall and the second side wall.

* * * * *